R. HEAD.
PROCESS OF MAKING SOUND RECORDS.
APPLICATION FILED MAR. 15, 1915.
1,318,997.
Patented Oct. 14, 1919.
3 SHEETS—SHEET 1.
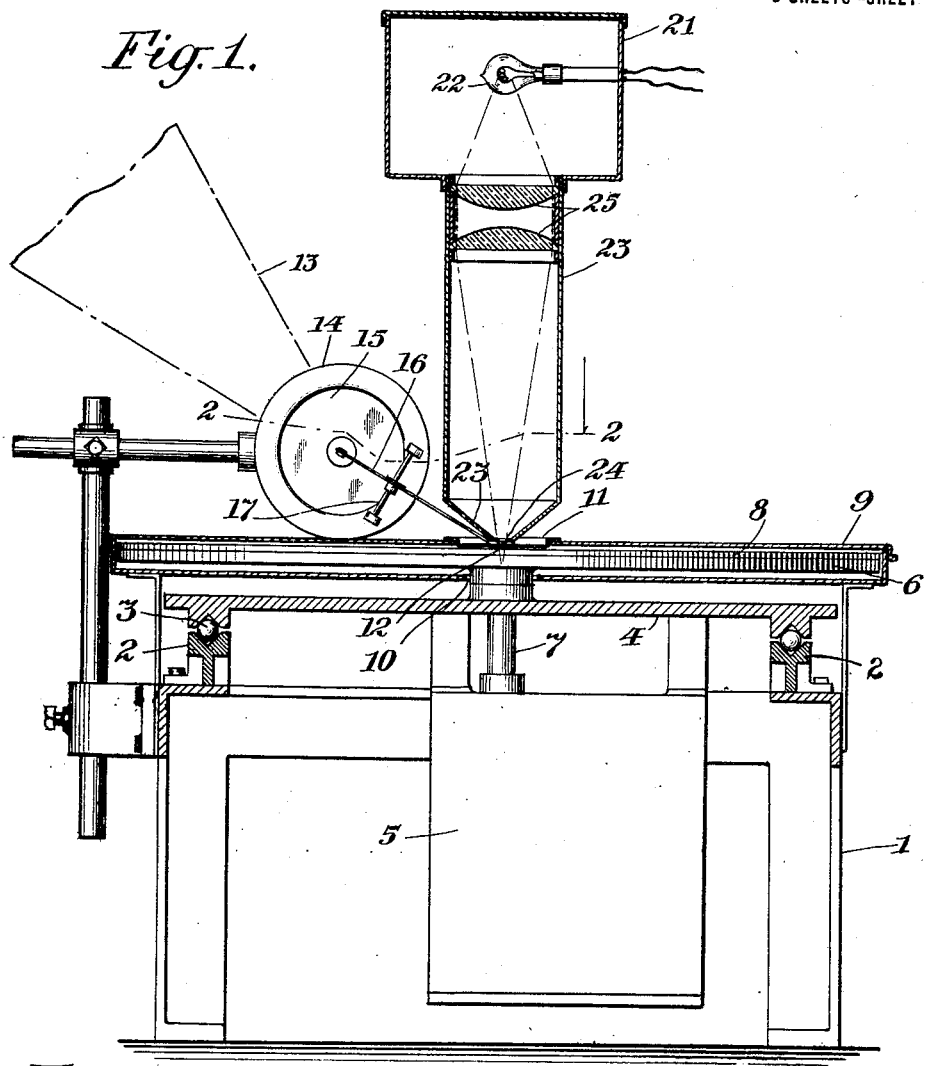
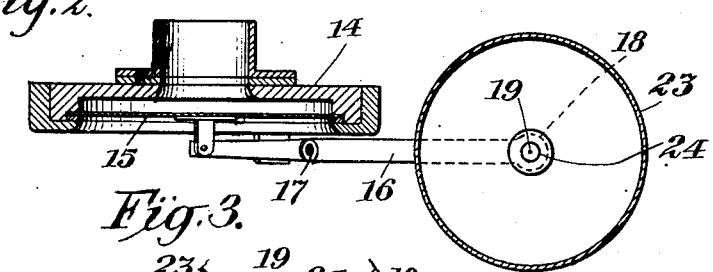
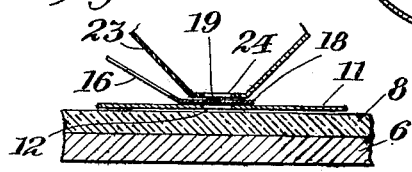
INVENTOR
Robert Head
BY Fischer
ATTORNEYS

R. HEAD.
PROCESS OF MAKING SOUND RECORDS.
APPLICATION FILED MAR. 15, 1915.

1,318,997.

Patented Oct. 14, 1919.
3 SHEETS—SHEET 2.

INVENTOR
Robert Head
BY
ATTORNEYS

R. HEAD.
PROCESS OF MAKING SOUND RECORDS.
APPLICATION FILED MAR. 15, 1915.
1,318,997.
Patented Oct. 14, 1919.
3 SHEETS—SHEET 3.
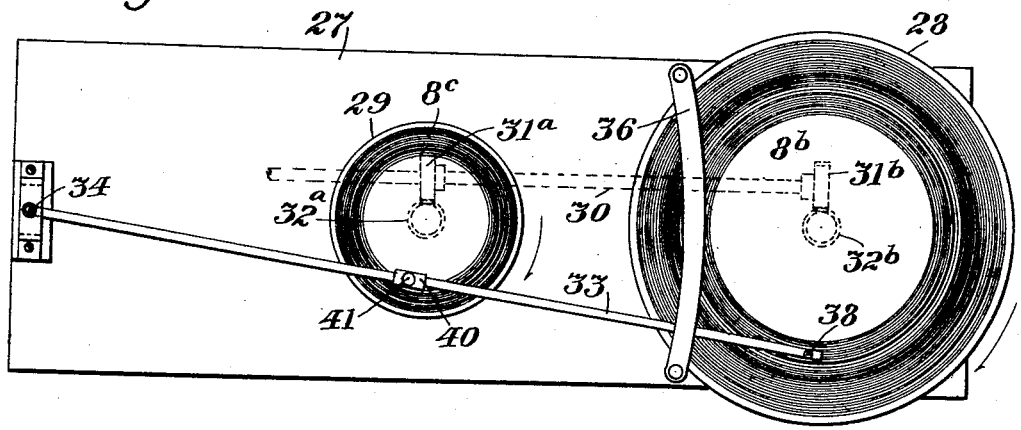
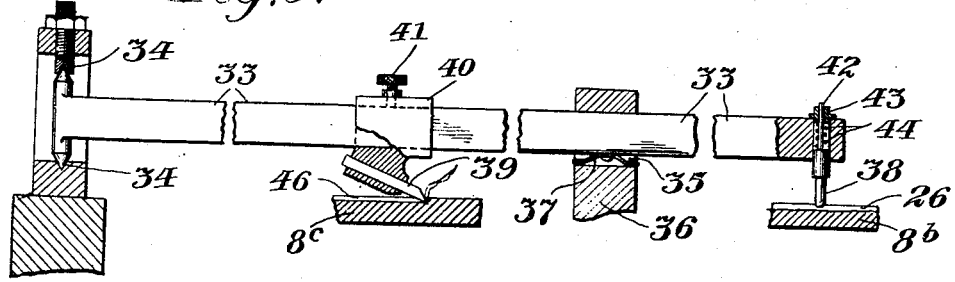
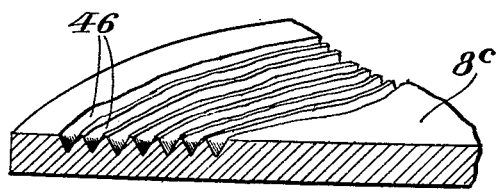
INVENTOR
Robert Head
BY
ATTORNEYS

UNITED STATES PATENT OFFICE.

ROBERT HEAD, OF NEW YORK, N. Y., ASSIGNOR TO THE AEOLIAN COMPANY, A CORPORATION OF CONNECTICUT.

PROCESS OF MAKING SOUND-RECORDS.

1,318,997.  Specification of Letters Patent.  Patented Oct. 14, 1919.

Application filed March 15, 1915. Serial No. 14,404.

*To all whom it may concern:*

Be it known that I, ROBERT HEAD, a citizen of the United States, and a resident of New York, in the county of New York and State of New York, have invented a certain new and useful Process of Making Sound-Records, of which the following is a specification.

My present invention relates to a process of making phonograph records and to apparatus therefor. The advantages will be readily appreciated by those skilled in the art from an understanding of the following description in connection with the drawings which illustrate the invention more or less diagrammatically.

Figure 4:
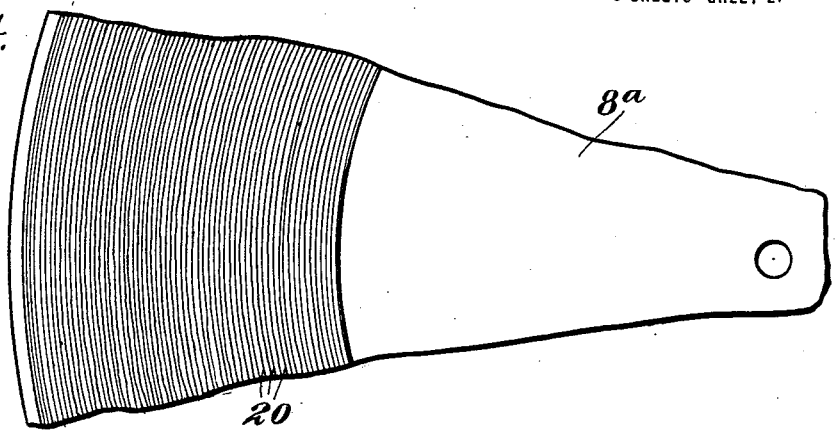
Figure 5:
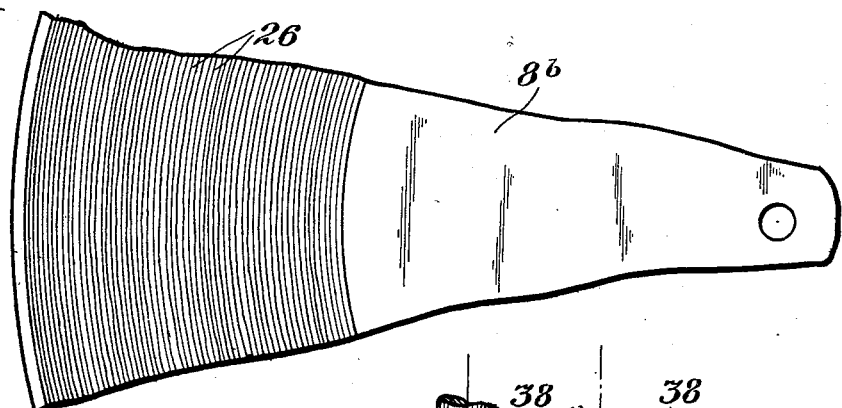
Figure 7:
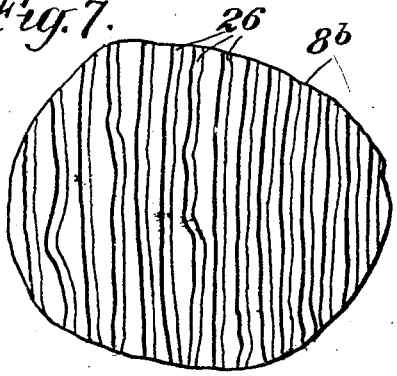
Figure 6:
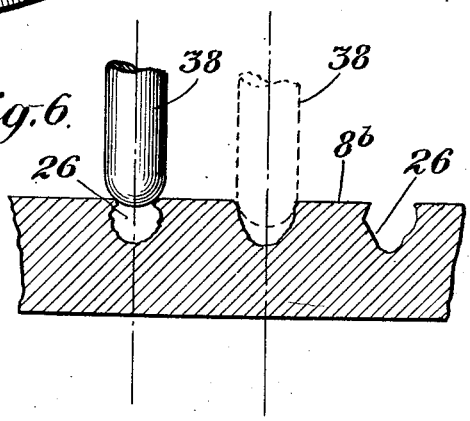

In these, Figure 1 is an end elevation of the photographic recording apparatus; Fig. 2 is an enlarged horizontal sectional view on the line 2—2 Fig. 1; Fig. 3 is an enlarged partial view of a part of Fig. 1; Fig. 4 is a fragment of an imaginary photographic negative made by the process; Fig. 5 is a fragment of an etched plate supposed to have been made from said negative, and to correspond therewith; Fig. 6 is an enlarged transverse section of said etched plate through three of the etched sound-grooves, the appearance of these grooves being merely imaginary and intended to illustrate possible, perhaps extreme variations in the etching thereof; Fig. 7 is a less enlarged portion of said etched plate showing the sound grooves as viewed from above; Fig. 8 is a plan view of a special pantograph apparatus for making another sound-record in any suitable material from the aforesaid etched plate; Fig. 9 is a partial elevation of this apparatus on an enlarged scale; and Fig. 10 is a partial perspective view of a record produced by said pantograph apparatus.

I will now describe my process in connection with the specific devices of the drawings. Briefly I prefer to photographically record the sound-waves, and then from that photograph produce said waves in the form of grooves in a plate by photo-engraving methods. I prefer to make both of these records of a larger size than the finished record. The drawings show the enlargement as being 2 to 1—see Fig. 8. The photo-engraved or etched sound-grooves will be more or less rough but by a special pantograph
process and appropriate means, I panto-
graph a finished record therefrom of reduced size which represents substantially the original photograph with the discrepancies introduced by the etching practically eliminated.
This so-called finished record will be made in any suitable or desired material, preferably metal, although wax-like and other material may be employed. A matrix will then be made therefrom by any known desirable method. For instance an electrotype which will strip may be made from it—whereupon said electrotype can be backed up and used as a matrix to press the commercial records in the usual or preferred commercial record-material.
The photographic apparatus which I have devised, comprises a rigid base 1 having parallel grooved ways or guides 2—2 for ball-bearings 3 on which rests and rolls the end-wise movable platform 4 having also appropriate ball-receiving grooves on its underside. 5 is a casing supported underneath this platform 4 to be carried therewith. It contains the operating mechanism including that which rotates the usual record turn-table 6 mounted on spindle 7. The turn-table supports a sensitized photographic plate or disk 8. Operating mechanism is further provided of any usual or preferred sort which gradually feeds the turn-table and photographic disk laterally (in this case supposedly at right angles to the plane of the drawing Fig. 1) at the same time that it is being rotated as previously explained—the operating means for accomplishing these two movements being old and well known, I have purposely omitted showing them for simplicity's sake and the better understanding of my invention. An inclosing stationary pan or casing 9 is provided mounted on brackets from the base 1 of the apparatus. The drawing shows the end of the pan but in the other direction it is longer to allow for the lateral feed of the turn-table and photographic plate 8. Further the bottom of the pan is slotted at 10 in said lengthwise direction to provide for said lateral feed of the spindle 7. The casing 9 is of course suitably made in two parts so that it can be opened to insert and remove the photographic plate and all joints should be light-tight to protect said plate. The top of the casing 9 has a downwardly extending cup-portion 11 having a hole 12 therein.

The usual recording apparatus is shown diagrammatically supported adjustably from the base 1. It comprises any usual or preferred horn 13, recorder 14, diaphragm 15, bar 16 and pivotal-suspension therefor 17 on which the bar pivots and vibrates in response to the action of the sound-waves on the diaphragm. The bar 16 consists of a light flat piece of metal with its free end bent to form a foot 18 which closely overlies the hole 12 so as to just clear without touching the bottom of the cup 11. The area of this foot 18 is so large relatively to the hole 12 that it shadows the hole and prevents the photographic plate from being light-struck by light entering under the edges of the foot. The foot has a minute perforation 19 through it whereon light is concentrated by means next to be described, whereby a beam of light is delivered downwardly through the minute perforation 19, which beam will then fall on the photograph plate through the relatively large hole 12 in the casing 9. Further it will be evident that as the foot 19 is vibrated laterally by the sound-waves acting on the diaphragm, the beam of light through the perforation 19 will be correspondingly vibrated and will exactly photographically record its vibrations on the rotating and laterally fed plate, film or other light sensitive surface 8; and this plate when developed will show a laterally waved or zigzag sound record, as indicated at 20 in Fig. 4.

The light concentrating means shown in Fig. 1 comprises a stationary box 21 rigidly supported over the pan or casing 9 for containing the actinic source of light 22. A tube 23 leads downwardly from this box and has its lower end closed except for an opening 24 located immediately over the foot 18 without touching it. 25 shows diagrammatically any suitable system of lenses for concentrating the light from the source 22 on the perforated foot 18. If the focal point of the light is at the sensitive surface of the plate, the resultant negative will show a minimumly fine light-traced sound-line. Since it is desirable that this line should have more width, the focus is arranged to be located appropriately below said sensitized surface.

The process thus far described produces the negative $8^a$ of Fig. 4. This is supposed to be a disk twice as large as the final commercial record, although of course it might be made of the same or some other relative size—but the enlargement has advantages. For example the negative is all the more detailed and accurate. The same applies to the resulting photo-engraved record. Finally the imperfections in that record are reduced by the pantographing step to the extent of the reduction. In this case, they will be reduced 50% because the finished record is one half the size of the photo-engraved record.

Proceeding now with the description, the next step produces the photo-engraved or etched record $8^b$ of Figs. 5, 6 and 7 having the etched out sound-grooves 26. This is made by any usual or preferred photo-engraving method, from the plate $8^a$. The etched sound-grooves 26 correspond as far as it is possible for etching to the light-traced sound waves 20 in the plate $8^a$.

The pantograph apparatus Figs. 8 and 9—comprises a baseplate 27 supporting a pair of turn-tables 28 and 29. 30 is a driving shaft having spiral gears $31^a$ and $31^b$ which respectively mesh with spiral gears $32^a$ and $32^b$ on the turn-table spindles to drive them both at the same rotary speed. The etched record $8^b$ is fixedly supported on the large turntable. A plain disk which subsequently becomes the finished record $8^c$ is similarly supported on the small turn table. 33 is the arm of the pantograph which should be constructed so as to be rigid against lateral bending. It is supported on the pivotal bearings 34 to swing freely in a horizontal plane over the faces of the disks $8^b$ and $8^c$. This arm 33 projects through the slot 35 in a curved stationary guide-member 36. 37 is a spring on the under-side of the arm which, bearing on the bottom of the slot, yieldingly upholds the arm against the top of the slot (see Fig. 9) so that the free end of the arm is yieldingly upheld in level position as the arm swings horizontally about the pivots 34. The above description assumes that the pantograph is supported horizontally on top of a table, but of course the directional expressions "horizontal" and the like are merely relative since it might be operated in some other position.

38 is a tracer at the free-end of the arm 33. It has a rounded point received into the grooves 26 (see Fig. 6) whose lateral deviations it is intended to follow and communicate to a record-cutting or forming tool 39 at the middle of the arm 33. In this way, the tracer 38 as it follows the etched spiral sound-grooves across the record causes the tool 39 to cut an identical record of reduced size at $8^c$. The tool 39 is rigidly supported in a holder 40 slidable along the arm 33 until fixed by the set screw 41.

The tracer 38 is yieldingly supported in vertical direction. For this purpose it slides freely in a vertical hole in the arm 33. Further it has a reduced portion 42 sliding in a hole through a cap 43 screw-threaded in the mouth of the hole in the arm. 44 is a compression spiral spring surrounding the reduced portion 42 of the tracer between its enlarged lower end and said cap 43. The result is that the point of the tracer 38 is always pressed into appropriate yielding contact with both walls of the groove 26 in spite of the fact that the etching may have produced grooves of irregular and non-uniform widths and shapes. Further said tracer will thereby center itself between the walls in spite of these irregularities so that the axis of the tracer will follow the median line of the groove and will communicate this motion to the other tool 39 so that the irregularities due to etching in the record 8$^b$ will be substantially corrected in the finished record 8$^c$.

The tool 39 may of course be a tracing, cutting or other kind of record forming tool. If a cutting-tool, I prefer to form it so that it will produce a distinctly V-shaped groove. This will tend to keep the reproducing stylus well down in the groove to the advantage of the accuracy and volume of the reproduction. Further since the tool 39 is mechanically guided in my invention instead of acoustically driven as in the usual recording method with cutting-tool attached to the recording diaphragm—it follows that I can easily get a deeper sound-groove with further resulting advantage to the accuracy and volume of the reproduction.

Again because the tool 39 is mechanically guided, I am not limited to making the record 8$^c$ in wax-like materials but can cut it in any appropriate metal, even in steel and the like. If steel, it may be subsequently hardened and used as a die. A thin sheet of soft steel or nickel or other appropriate metal may be pressed into the face of this die—so that it takes an impression of its grooves. This sheet may then be backed up, hardened and used as a matrix to press the commercial records.

Or as another alternative, an electrotype in nickel or copper or both which may be stripped, can be made from the record 8$^c$, which electrotype can then be backed up as usual and used as a matrix to press the commercial records.

Also any other workable process may be used to produce the commercial records from the record 8$^c$.

Of course changes and modifications can be made in the above that are nevertheless within the spirit of this inventive disclosure as revealed in the foregoing description and the following claims.

What I claim is:

1. The process of making phonograph records which comprises making an etched zig-zag sound-groove, following with a tracer the edges of said groove, and guiding by said tracer a record-forming tool to make a copy of said groove in a blank.

2. The process of making phonograph records which comprises making a record having a sound groove etched therein and producing in another record a sound groove which conforms with the median line of the two edges of the etched groove in the first-mentioned record.

3. The process of making phonograph records which comprises making a record having a sound groove etched therein and pantographing another record of reduced size from the etched record to produce in said sound record a sound groove which conforms with the median line of the two edges of the etched groove of the first-mentioned record.

4. The process of making phonograph records which comprises making an etched lateral or zig-zag sound groove, and pantographing another record groove from the etched sound groove in conformity with the median line of the edges thereof.

5. The process of making phonograph records which comprises making an etched lateral or zig-zag sound groove, and pantographing another zig-zag record groove having reduced amplitude from the etched sound groove and in conformity with the median line of the edges thereof.

6. The process of making phonograph records which comprises making an etched zig-zag sound groove, following with a tracer the edges of said groove whereby the tracer is guided in accordance with the median line of such edges, guiding by said tracer a record forming tool to copy the sound groove in a material resistant to considerable pressure, and making by such pressure a reverse impression thereof in a material adapted to be used for a matrix.

7. The process of making phonograph records which comprises making an etched zig-zag sound groove, pantographing a copy therefrom in a material resistant to considerable pressure, and making by such pressure a reverse impression thereof in a material adapted to be used for a matrix.

Signed at New York in the county of New York and State of New York this 13th day of March A. D. 1915.

ROBERT HEAD.